(12) United States Patent
Maeda et al.

(10) Patent No.: US 11,384,407 B2
(45) Date of Patent: Jul. 12, 2022

(54) HIGH-STRENGTH GALVANNEALED STEEL SHEET

(71) Applicant: JFE Steel Corporation, Tokyo (JP)

(72) Inventors: Satoshi Maeda, Tokyo (JP); Yoichi Makimizu, Tokyo (JP); Yoshitsugu Suzuki, Tokyo (JP); Yoshiyasu Kawasaki, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 782 days.

(21) Appl. No.: 16/310,951

(22) PCT Filed: Jun. 5, 2017

(86) PCT No.: PCT/JP2017/020764
§ 371 (c)(1),
(2) Date: Dec. 18, 2018

(87) PCT Pub. No.: WO2018/003407
PCT Pub. Date: Jan. 4, 2018

(65) Prior Publication Data
US 2020/0308664 A1    Oct. 1, 2020

(30) Foreign Application Priority Data

Jun. 27, 2016    (JP) .............................. JP2016-126251

(51) Int. Cl.
*B32B 15/01*    (2006.01)
*C22C 38/38*    (2006.01)
(Continued)

(52) U.S. Cl.
CPC ............... *C21D 9/46* (2013.01); *B32B 15/01* (2013.01); *B32B 15/013* (2013.01); *B32B 15/04* (2013.01); *B32B 15/043* (2013.01); *B32B 15/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0236* (2013.01); *C21D 8/0273* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01);
(Continued)

(58) Field of Classification Search
CPC .. C21D 8/0205; C21D 8/0236; C21D 8/0273; C21D 6/001; C21D 6/002; C21D 6/005; C21D 6/008; C21D 9/46; B32B 15/013; B32B 15/01; B32B 15/04; B32B 15/043; B32B 15/18; C22C 38/002; C22C 38/008; C22C 38/02; C22C 38/04; C22C 38/06; C22C 38/08; C22C 38/12; C22C 38/14; C22C 38/16; C22C 38/32; C22C 38/38; C22C 38/60; C22C 38/18; C22C 38/20; C22C 38/22; C22C 38/24; C22C 38/26; C22C 38/28; C22C 38/40; C22C 38/42; C22C 38/44; C22C 38/46; C22C 38/48; C22C 38/50; C22C 38/54; C22C 38/58; C23C 2/06; C23C 2/28; C23C 2/40; C23C 2/02; C23C 30/00; C23C 30/005; C23C 28/025; C23C 28/02; Y10T 428/27; Y10T 428/264; Y10T 428/263; Y10T 428/265; Y10T 428/2495; Y10T 428/24967; Y10T 428/12799; Y10T 428/12951; Y10T 428/12965; Y10T 428/12972

See application file for complete search history.

(56) References Cited

U.S. PATENT DOCUMENTS 8,634,989 B1    1/2014    Schramm
2001/0031377 A1*    10/2001    Hashimoto ............... C23C 2/02
428/659

(Continued)

FOREIGN PATENT DOCUMENTS

CN    103890202 A1    6/2014
CN    104769146 A    7/2015
(Continued)

OTHER PUBLICATIONS

Korean Office Action for Korean Application No. 10-2018-7036385, dated Jul. 3, 2020 with Concise Statement of Relevance of Office Action, 8 pages.
(Continued)

*Primary Examiner* — Michael E. La Villa
(74) *Attorney, Agent, or Firm* — RatnerPrestia

(57) ABSTRACT

Provided are a high-strength galvannealed steel sheet, and a manufacturing method therefor. The manufacturing method is for a high-strength galvannealed steel sheet which includes a zinc coated layer with a coating weight of 20 to 120 g/m² per side on a surface of a steel sheet having a chemical composition containing, in mass %, C: 0.03 to 0.35%, Si: 0.01 to 1.00%, Mn: 3.6 to 8.0%, Al: 0.001 to 1.00%, P: 0.100% or less, and S: 0.010% or less, with the balance being Fe and inevitable impurities. The method includes: setting a cold rolling reduction ratio to 20% or more and 35% or less when cold rolling is performed on the steel sheet, and setting a maximum steel sheet temperature to be reached in an annealing furnace to 600° C. or higher and 700° C. or lower when annealing is further performed on the steel sheet.

5 Claims, No Drawings

(51) Int. Cl.
| | |
|---|---|
| C22C 38/16 | (2006.01) |
| C22C 38/14 | (2006.01) |
| C22C 38/12 | (2006.01) |
| C22C 38/08 | (2006.01) |
| C22C 38/06 | (2006.01) |
| C22C 38/02 | (2006.01) |
| C22C 38/00 | (2006.01) |
| C23C 2/06 | (2006.01) |
| C23C 2/28 | (2006.01) |
| C23C 2/40 | (2006.01) |
| C21D 6/00 | (2006.01) |
| C21D 8/02 | (2006.01) |
| C21D 9/46 | (2006.01) |
| C22C 38/04 | (2006.01) |
| C22C 38/32 | (2006.01) |
| C22C 38/60 | (2006.01) |
| B32B 15/04 | (2006.01) |
| C22C 38/54 | (2006.01) |
| C22C 38/28 | (2006.01) |
| C22C 38/50 | (2006.01) |
| C23C 2/02 | (2006.01) |
| C22C 38/24 | (2006.01) |
| C22C 38/58 | (2006.01) |
| C23C 28/02 | (2006.01) |
| C22C 38/26 | (2006.01) |
| C22C 38/48 | (2006.01) |
| C22C 38/40 | (2006.01) |
| C22C 38/22 | (2006.01) |
| C22C 38/44 | (2006.01) |
| C23C 30/00 | (2006.01) |
| C22C 38/20 | (2006.01) |
| C22C 38/18 | (2006.01) |
| C22C 38/46 | (2006.01) |
| B32B 15/18 | (2006.01) |
| C22C 38/42 | (2006.01) |

(52) U.S. Cl.
CPC ............. *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C23C 2/02* (2013.01); *C23C 2/06* (2013.01); *C23C 2/28* (2013.01); *C23C 2/40* (2013.01); *C23C 28/02* (2013.01); *C23C 28/025* (2013.01); *C23C 30/00* (2013.01); *C23C 30/005* (2013.01); *Y10T 428/12799* (2015.01); *Y10T 428/12951* (2015.01); *Y10T 428/12965* (2015.01); *Y10T 428/12972* (2015.01); *Y10T 428/2495* (2015.01); *Y10T 428/24967* (2015.01); *Y10T 428/263* (2015.01); *Y10T 428/264* (2015.01); *Y10T 428/265* (2015.01); *Y10T 428/27* (2015.01)

(56) References Cited

U.S. PATENT DOCUMENTS

| | | |
|---|---|---|
| 2013/0236740 A1 | 9/2013 | Kojima et al. |
| 2014/0255724 A1 | 9/2014 | Yamanaka et al. |
| 2014/0360632 A1* | 12/2014 | Hasegawa ............ C21D 8/0436 148/533 |
| 2016/0002762 A1 | 1/2016 | Fushiwaki et al. |
| 2016/0194739 A1 | 7/2016 | Del Frate et al. |

FOREIGN PATENT DOCUMENTS

| | | |
|---|---|---|
| CN | 105026600 A | 11/2015 |
| CN | 105568132 A | 5/2016 |
| EP | 1595969 A1 | 11/2005 |
| EP | 2772556 A1 | 9/2014 |
| EP | 2918696 A1 | 9/2015 |
| EP | 2940176 A1 | 11/2015 |
| EP | 3109338 A1 | 12/2016 |
| JP | 2004263295 A | 9/2004 |
| JP | 4464720 B2 | 5/2010 |
| JP | 4718782 B2 | 7/2011 |
| JP | 2013185215 A | 9/2013 |
| JP | 2014015675 A | 1/2014 |
| WO | 2013047812 A1 | 4/2013 |
| WO | 2013061545 A1 | 5/2013 |
| WO | 2014136412 A1 | 9/2014 |
| WO | 2015001414 A1 | 1/2015 |
| WO | 2015125433 A1 | 8/2015 |

OTHER PUBLICATIONS

Chinese Office Action with Search Report for Chinese Application No. 201780039553.X, dated Dec. 26, 2019, 11 pages.
Extended European Search Report for European Application No. 17 819 772.9, dated Feb. 27, 2019, 10 pages.
Japanese Office Action for Japanese Application No. 2016-126251, dated Sep. 25, 2018, with Concise Statement of Relevance of Office Action, 5 pages.
International Search Report and Written Opinion for International Application No. PCT/JP2017/020764, dated Sep. 5, 2017—6 pages.

* cited by examiner

HIGH-STRENGTH GALVANNEALED STEEL SHEET

CROSS REFERENCE TO RELATED APPLICATIONS

This is the U.S. National Phase application of PCT/JP2017/020764, filed Jun. 5, 2017, which claims priority to Japanese Patent Application No. 2016-126251, filed Jun. 27, 2016, the disclosures of each of these applications being incorporated herein by reference in their entireties for all purposes.

FIELD OF THE INVENTION

The present invention relates to a high-strength galvannealed steel sheet including a TRIP steel sheet containing 3.6 to 8.0% Mn as a base material and having excellent formability and hole expansion properties and to a manufacturing method therefor.

BACKGROUND OF THE INVENTION

In the fields of automobiles, home appliances, construction materials, and so forth, surface-treated steel sheets in which rust resistance is imparted to raw material steel sheets, especially, galvannealed steel sheets having excellent rust resistance, have been used in recent years. In particular, in the automotive field, in view of enhanced fuel efficiency and crashworthiness, the use of high-strength galvannealed steel sheets has been increasing for the purpose of reducing weight and increasing strength of automobile bodies through thinning of body materials by increasing strength. Galvannealed steel sheets are typically manufactured according to the following method. First, in a thin steel sheet obtained by hot rolling and cold rolling of a slab, a surface of the steel sheet as a base material is cleaned by degreasing and/or pickling in a pretreatment process, or oil on a surface of the steel sheet as a base material is removed by combustion in a preheating furnace without the pretreatment process. Next, recrystallization annealing is performed by heating the steel sheet in a non-oxidizing atmosphere or a reducing atmosphere. Then, the steel sheet is cooled in a non-oxidizing atmosphere or a reducing atmosphere to a temperature suitable for coating, and the steel sheet surface is galvanized by immersing the steel sheet in a hot-dip galvanizing bath without exposing to air. Subsequently, the steel sheet is further heat-treated in an alloying furnace to yield a galvannealed steel sheet.

To increase strength of a steel sheet, addition of solid solution strengthening elements, such as Si, Mn, or Al, is effective. Among these elements, Mn stabilizes the austenite phase, thereby effectively increasing the fraction of the austenite phase. In addition, the retained austenite phase exhibits transformation-induced plasticity, thereby dramatically enhancing elongation. A steel sheet having such dramatically enhanced ductility through strain-induced transformation of the retained austenite is called TRIP steel. In TRIP steel, however, the retained austenite phase is transformed into martensite during punching before hole expansion processing. Accordingly, during hole expansion processing, stress concentration at phase interfaces is promoted as in DP steel. As a result, there is a problem in which hole expansion properties of TRIP steel deteriorate.

Accordingly, the present inventors intensively investigated hole expansion properties of TRIP steel. As a result, it was revealed for the first time that galvannealing performed on a TRIP steel sheet further impairs hole expansion properties. In turn, impaired hole expansion properties make forming of complex-shaped parts difficult. Accordingly, there is a need for a technique to improve hole expansion properties of a galvannealed steel sheet including Mn-containing TRIP steel as a base material.

Some techniques have been disclosed concerning improved hole expansion properties. Patent Literature 1 discloses a technique to enhance stability of the retained austenite phase by forming a stable austenite phase through a controlled concentration gradient of C in the austenite phase without increasing martensite hardness after transformation, thereby improving hole expansion properties.

Patent Literature 2 discloses a technique to achieve both excellent strength and hole expansion properties by controlling the retained austenite so as to have a specific form and by actively forming such retained austenite not only in interlath regions of bainitic ferrite, which is a parent phase in the steel sheet microstructure, but also at specific sites, i.e., triple junctions at grain boundaries corresponding to overlapped prior austenite grain boundaries.

PATENT LITERATURE

PTL 1: Japanese Patent No. 4464720
PTL 2: Japanese Patent No. 4718782

SUMMARY OF THE INVENTION

The techniques described in Patent Literature 1 and 2 are recognized to have improved effects on hole expansion properties. Patent Literature 1 and 2, however, do not take into account impaired hole expansion properties due to galvannealing performed on a TRIP steel sheet. Accordingly, when galvannealing is performed on a TRIP steel sheet, there is a problem in which satisfactory hole expansion properties are not achieved.

Aspects of the present invention have been made in view of the above, and an object according to aspects of the present invention is to provide a high-strength galvannealed steel sheet including a Mn-containing TRIP steel sheet as a base material and having excellent formability and hole expansion properties, as well as a manufacturing method therefor.

To achieve the above-mentioned object, the present inventors have continued intensive research on a method of improving deterioration in hole expansion properties when galvannealing is performed on a Mn-containing TRIP steel sheet.

As a result, it was revealed that dispersing Mn in a form not corresponding to any of an oxide, a carbide, or a sulfide in a coated layer, in other words, increasing the concentration of Mn in a form not corresponding to any of an oxide, a carbide, or a sulfide in a coated layer, can improve hole expansion properties of a galvannealed TRIP steel sheet. This is presumably because solid solution Mn increases the strength of a coated layer, thereby decreasing a difference in strength between the coated layer and the base material. The present inventors also found that controlled strain on a steel sheet surface and controlled recrystallization in annealing before coating are important to disperse Mn in the coated layer.

Aspects of the present invention have been completed on the basis of the above findings and are summarized as follows.

[1] A method of manufacturing a high-strength galvannealed steel sheet which includes a zinc coated layer with a coating weight of 20 to 120 g/m² per side on a surface of a steel sheet having a chemical composition containing, in mass %, C: 0.03 to 0.35%, Si: 0.01 to 1.00%, Mn: 3.6 to 8.0%, Al: 0.001 to 1.00%, P: 0.100% or less, and S: 0.010% or less, with the balance being Fe and inevitable impurities, the method including: setting a cold rolling reduction ratio to 20% or more and 35% or less when cold rolling is performed on the steel sheet; and setting a maximum steel sheet temperature to be reached in an annealing furnace to 600° C. or higher and 700° C. or lower when annealing is further performed on the steel sheet.

[2] The method of manufacturing a high-strength galvannealed steel sheet according to [1], when the cold rolling is performed, including rolling by using, as a roll for final stand, a roll which has an arithmetic-average rolling roll surface roughness Ra of 3.6 μm or more.

[3] The method of manufacturing a high-strength galvannealed steel sheet according to [1] or [2], when the annealing is performed, including: setting a steel sheet transit time in a steel sheet temperature range of 500° C. or higher and 700° C. or lower to 30 seconds or more and 600 seconds or less; setting a hydrogen concentration in the steel sheet temperature range of 500° C. or higher and 700° C. or lower to 5 vol % or more and 50 vol % or less; and setting a dew point of an atmosphere in the steel sheet temperature range of 500° C. or higher and 700° C. or lower to −65° C. or higher and −25° C. or lower.

[4] The method of manufacturing a high-strength galvannealed steel sheet according to any one of [1] to [3], where the steel sheet contains, in mass %, in addition to the chemical composition, one or more selected from B: 0.001 to 0.005%, Nb: 0.005 to 0.050%, Ti: 0.005 to 0.100%, Cr: 0.001 to 1.000%, Mo: 0.05 to 1.00%, Cu: 0.05 to 1.00%, Ni: 0.05 to 1.00%, Sn: 0.001 to 0.200%, Sb: 0.001 to 0.200%, Ta: 0.001 to 0.100%, W: 0.001 to 0.100%, and V: 0.001 to 0.100%.

[5] The method of manufacturing a high-strength galvannealed steel sheet according to any one of [1] to [4], where Fe content of the zinc coated layer is set to a 7 to 15 mass % range, and the zinc coated layer contains 0.25 mass % or more of Mn in a form not corresponding to any of an oxide, a carbide, or a sulfide.

[6] A high-strength galvannealed steel sheet having a chemical composition containing, in mass %, C: 0.03 to 0.35%, Si: 0.01 to 1.00%, Mn: 3.6 to 8.0%, Al: 0.001 to 1.00%, P: 0.100% or less, and S: 0.010% or less, with the balance being Fe and inevitable impurities, and including a zinc coated layer with a coating weight of 20 to 120 g/m² per side on a surface of a steel sheet, where: Fe content of the zinc coated layer is set to a 7 to 15 mass % range; and the zinc coated layer contains 0.25 mass % or more of Mn in a form not corresponding to any of an oxide, a carbide, or a sulfide.

[7] The high-strength galvannealed steel sheet according to [6], further containing, in mass %, in addition to the chemical composition, one or more selected from B: 0.001 to 0.005%, Nb: 0.005 to 0.050%, Ti: 0.005 to 0.100%, Cr: 0.001 to 1.000%, Mo: 0.05 to 1.00%, Cu: 0.05 to 1.00%, Ni: 0.05 to 1.00%, Sn: 0.001 to 0.200%, Sb: 0.001 to 0.200%, Ta: 0.001 to 0.100%, W: 0.001 to 0.100%, and V: 0.001 to 0.100%.

In accordance with aspects of the present invention, high strength means tensile strength TS of 980 MPa or higher. Excellent formability according to aspects of the present invention means elongation El≥24% for TS of 980 MPa grade and elongation El≥18% for TS of 1,180 MPa grade. Further, excellent hole expansion properties according to aspects of the present invention means a hole expansion ratio λ of 20% or higher. In accordance with aspects of the present invention, TS of 980 MPa grade refers to a steel sheet having TS of 980 MPa or higher and lower than 1,180 MPa, whereas TS of 1,180 MPa grade refers to a steel sheet having TS of 1,180 MPa or higher. Further, a steel sheet temperature means a temperature on a steel sheet surface.

According to aspects of the present invention, a high-strength galvannealed steel sheet including a Mn-containing TRIP steel sheet as a base material and having excellent formability and hole expansion properties can be obtained.

DETAILED DESCRIPTION OF EMBODIMENTS OF THE INVENTION

Hereinafter, embodiments of the present invention will be described. The present invention, however, is not limited to the following embodiments.

First, a summary of aspects of the present invention will be given.

Aspects of the present invention are characterized by improved hole expansion properties through providing an increased amount of strain on a steel sheet surface in processes from cold rolling to plating bath immersion and through promoting diffusion of Mn into a coated layer in an alloying process. As a result, a high-strength galvannealed steel sheet having excellent formability and hole expansion properties can be obtained.

For controlling Mn concentration in a coated layer, cold rolling conditions and annealing conditions are most important. Specifically, it is important to set a cold rolling reduction ratio to 20% or more and 35% or less when cold rolling is performed on a hot-rolled sheet containing the components described hereinafter in a cold rolling mill; and to set a maximum steel sheet temperature to be reached in an annealing furnace to 600° C. or higher and 700° C. or lower when annealing and galvanizing treatment are performed. By setting as above, diffusion of Mn into a coated layer can be promoted, thereby achieving a concentration of Mn of 0.25 mass % or more in a form not corresponding to any of an oxide, a carbide, or a sulfide in the coated layer.

Further, in cold rolling, it is preferable to roll by using, as a roll for final stand, a roll which has an arithmetic-average rolling roll surface roughness (Ra) of 3.6 μm or more. In this case, the surface area on a steel sheet surface increases, thereby activating an alloying reaction. In addition, diffusion of Mn into a coated layer can be promoted.

Furthermore, when annealing is performed on a steel sheet, it is preferable to set a steel sheet transit time in a steel sheet temperature range of 500° C. or higher and 700° C. or lower to 30 seconds or more and 600 seconds or less; to set a hydrogen concentration in the steel sheet temperature range of 500° C. or higher and 700° C. or lower to 5 vol % or more and 50 vol % or less; and to set a dew point of an atmosphere in the steel sheet temperature range of 500° C. or higher and 700° C. or lower to −65° C. or higher and −25° C. or lower. In this case, the amount of Mn oxide formed on a steel sheet surface can be decreased, thereby promoting diffusion of Mn into a coated layer.

Next, the steel chemical composition of a steel sheet used in accordance with aspects of the present invention will be described. In the following description, the content of each element of the steel chemical composition and the content of each element of the coated layer chemical composition are represented as "mass %", and hereinafter simply denoted as "%" unless otherwise indicated.

C: 0.03 to 0.35%

C effectively increases strength of a steel sheet. To obtain such an effect, C content is to be 0.03% or more. Meanwhile, when C content exceeds 0.35%, weldability required for manufacture of automobiles, home appliances, and so forth cannot be achieved. Accordingly, C content is set to 0.03% or more and 0.35% or less and more preferably 0.08% or more and 0.22% or less.

Si: 0.01 to 1.00%

Si is an element effective for strengthening and increasing ductility of steel. To obtain such effects, Si content is to be 0.01% or more. When Si content is less than 0.01%, the intended strength and ductility according to aspects of the present invention cannot be achieved. Meanwhile, when Si content exceeds 1.00%, Si forms an oxide on a steel sheet surface during annealing before coating, thereby impairing coating appearance. Accordingly, Si content is set to 0.01% or more and 1.00% or less and more preferably 0.10% or more and 0.70% or less.

Mn: 3.6 to 8.0%

Mn stabilizes the austenite phase and is an element effective for significantly increasing ductility. To obtain such effects, Mn content is to be 3.6% or more. Meanwhile, when Mn content exceeds 8.0%, weldability required for manufacture of automobiles, home appliances, and so forth cannot be achieved. Accordingly, Mn content is set to 3.6% or more, and 8.0% or less and preferably 4.0% or more and preferably 7.0% or less.

Al: 0.001 to 1.00%

Al is added to molten steel for the purpose of deoxidation, but the purpose cannot be achieved when the content is less than 0.001%. The deoxidizing effect on molten steel is obtained at 0.001% or more. Meanwhile, when Al content exceeds 1.00%, Al forms an oxide on a steel sheet surface during annealing before coating, thereby impairing coating appearance. Accordingly, Al content is set to 0.001% or more and 1.00% or less.

P: 0.100% or less

As P increases, manufacturability of slabs deteriorates. In addition, incorporation of P suppresses an alloying reaction and causes coating unevenness. P content thus needs to be 0.100% or less. Accordingly, P content is set to 0.100% or less and preferably 0.050% or less. P is one of the elements contained incidentally, but an increased cost is a concern for achieving P content of less than 0.001%. Therefore, P content is preferably 0.001% or more.

S: 0.010% or less

S is an element that tends to cause hot shortness and an element to consequently be decreased preferably, but S is allowable up to 0.010%. Accordingly, S content is set to 0.010% or less and is preferably decreased as much as possible.

The balance is Fe and inevitable impurities.

By including the above essential elements, the effects according to aspects of the present invention can be obtained. The following elements, however, may be incorporated as necessary for the purpose of further improving balanced strength and ductility.

One or More Selected from B: 0.001 to 0.005%, Nb: 0.005 to 0.050%, Ti: 0.005 to 0.100%, Cr: 0.001 to 1.000%, Mo: 0.05 to 1.00%, Cu: 0.05 to 1.00%, Ni: 0.05 to 1.00%, Sn: 0.001 to 0.200%, Sb: 0.001 to 0.200%, Ta: 0.001 to 0.100%, W: 0.001 to 0.100%, and V: 0.001 to 0.100%

B: 0.001 to 0.005%

B content of less than 0.001% makes it difficult to obtain an effect of promoting quenching in some cases. Meanwhile, B content exceed 0.005% impairs chemical conversion properties in some cases. Accordingly, if contained, B content is set to 0.001% or more and 0.005% or less.

Nb: 0.005 to 0.050%

Nb enhances strength and ductility through grain refinement. Nb content of less than 0.005% makes it difficult to obtain such an effect in some cases. Meanwhile, Nb content exceed 0.050% increases costs in some cases. Accordingly, if contained, Nb content is set to 0.005% or more and 0.050% or less.

Ti: 0.005 to 0.100%

Ti enhances strength and ductility through grain refinement. Ti content of less than 0.005% makes it difficult to obtain such an effect in some cases. Meanwhile, Ti content exceed 0.100% impairs chemical conversion properties in some cases. Accordingly, if contained, Ti content is set to 0.005% or more and 0.100% or less.

Cr: 0.001 to 1.000%

Cr content of less than 0.001% makes it difficult to obtain an effect of promoting quenching in some cases. Meanwhile, Cr content exceed 1.000% causes surface segregation of Cr and thus impairs weldability in some cases. Accordingly, if contained, Cr content is set to 0.001% or more and 1.000% or less.

Mo: 0.05 to 1.00%

Mo content of less than 0.05% makes it difficult to obtain a strength-adjusting effect in some cases. Meanwhile, Mo content exceed 1.00% increases costs in some cases. Accordingly, if contained, Mo content is set to 0.05% or more and 1.00% or less.

Cu: 0.05 to 1.00%

Cu content of less than 0.05% makes it difficult to obtain an effect of promoting formation of the retained $\gamma$ phase in some cases. Meanwhile, Cu content exceed 1.00% increases costs in some cases. Accordingly, if contained, Cu content is set to 0.05% or more and 1.00% or less.

Ni: 0.05 to 1.00%

Ni content of less than 0.05% makes it difficult to obtain an effect of promoting formation of the retained $\gamma$ phase in some cases. Meanwhile, Nb content exceed 1.00% increases costs in some cases. Accordingly, if contained, Ni content is set to 0.05% or more and 1.00% or less.

Sn: 0.001 to 0.200%

Sn effectively suppresses nitriding and cracking of a steel sheet surface. Sn content of less than 0.001% makes it difficult to obtain such an effect in some cases. Meanwhile, the effect levels off when Sn content exceeds 0.200%. Accordingly, if contained, Sn content is set to 0.001% or more and 0.200% or less.

Sb: 0.001 to 0.200%

Sb may be contained from a viewpoint of suppressing nitriding or oxidation on a steel sheet surface, or suppressing decarburization in a region of several tens of microns on a steel sheet surface formed by oxidation. If contained, by suppressed nitriding or oxidation, Sb prevents a decrease in the amount of martensite formed on a steel sheet surface. Consequently, it leads to the improvement of fatigue characteristics and surface quality. Sb content of less than 0.001% cannot achieve such effects in some cases. Meanwhile, Sb content exceed 0.200% impairs toughness in some cases. Accordingly, if contained, Sb content is set to 0.001% or more and 0.200% or less.

Ta: 0.001 to 0.100%

Ta forms a carbide and/or a carbonitride with C and/or N, thereby contributing to increased strength and an enhanced yield ratio (YR). Moreover, Ta plays a role in microstructure refinement of a hot-rolled sheet, and thus the result is refinement of the ferrite particle size after cold rolling and annealing. Consequently, the amount of C segregation in grain boundaries increases due to the increased grain boundary area, thereby achieving a high degree of bake hardening (BH). In view of the above, 0.001% or more of Ta may be contained. Meanwhile, incorporation of excessive Ta exceed 0.100% may not only increase raw material costs, but also interfere with formation of martensite in a cooling process after annealing. Further, TaC precipitated in a hot-rolled sheet increases deformation resistance during cold rolling, thereby making stable commercial manufacture difficult in some cases. For this reason, if contained, Ta is set to 0.100% or less. Therefore, if contained, Ta content is set to 0.001% or more and 0.100% or less.

W: 0.001 to 0.100%

W effectively suppresses formation of the F phase and enhances coating adhesion by being incorporated together with Si and Mn. Such an effect is observed by incorporating 0.001% or more of W. Meanwhile, even if W is contained exceed 0.100%, the above-mentioned effect levels off, an effect corresponding to the content cannot be expected, and it results in an economic disadvantage in some cases. Accordingly, if contained, W content is set to 0.001% or more and 0.100% or less.

V: 0.001 to 0.100%

V is an element that forms a carbonitride and plays a role in increasing strength of steel through the precipitation hardening and may be contained as necessary. Such an effect is observed by incorporating 0.001% or more of V. Meanwhile, when V is contained exceed 0.100%, strength increases excessively and thus ductility deteriorates in some cases. Accordingly, if contained, V content is set to 0.001% or more and 0.100% or less.

Next, the concentration of Mn present in a coated layer and the Fe concentration of a coated layer will be described. As described above, a high-strength galvannealed steel sheet in accordance with aspects of the present invention is characterized by improved hole expansion properties of a galvannealed TRIP steel sheet by dispersing Mn in a form not corresponding to any of an oxide, a carbide, or a sulfide in a coated layer, in other words, by increasing the concentration of Mn in a form not corresponding to any of an oxide, a carbide, or a sulfide in the coated layer.

A steel sheet having 0.25 mass % or more concentration of Mn in a form not corresponding to any of an oxide, a carbide, or a sulfide in a coated layer can be obtained by rolling a steel sheet having the above-described chemical composition in accordance with the above-mentioned cold rolling reduction ratio (20% or more and 35% or less) and further heating after coating so as to have an Fe concentration of 7 to 15 mass % in the coated layer while controlling a maximum steel sheet temperature to be reached in an annealing furnace (600° C. or higher and 700° C. or lower). By dispersing Mn in a form not corresponding to any of an oxide, a carbide, or a sulfide in the coated layer, the strength of the coated layer is increased and hole expansion properties are improved. Such an effect can be obtained when a coated layer contains 0.25 mass % or more of Mn in a form not corresponding to any of an oxide, a carbide, or a sulfide. Meanwhile, when the concentration of Mn in a form not corresponding to any of an oxide, a carbide, or a sulfide in the coated layer exceeds 1.2 mass %, the above-mentioned effect levels off and thus the concentration of Mn is desired to be 1.2 mass % or less. The concentration of Mn in a form not corresponding to any of an oxide, a carbide, or a sulfide in a coated layer (hereinafter, in some cases, also referred to as the concentration of Mn in the non-oxide, non-carbide, non-sulfide form in a coated layer in some cases) can be determined by the method described in the Examples section. The concentration of Mn in a form not corresponding to any of an oxide, a carbide, or a sulfide in a coated layer can be controlled by manufacturing conditions, especially the amount of strain on a steel sheet surface, for example.

In accordance with aspects of the present invention, the Fe concentration in a coated layer after alloying is set to, in terms of mass ratio, 7 to 15 mass %. If the Fe concentration in a coated layer is less than 7 mass %, alloying unevenness arises and flaking properties deteriorate. Meanwhile, if the Fe concentration in a coated layer exceeds 15 mass %, a large amount of brittle Γ phase forms in the coated layer, thereby impairing peeling resistance of coatings. The Fe concentration in a coated layer is preferably 9% or more and 11% or less.

Next, the most important aspect of the present invention, i.e., a manufacturing method for a high-strength galvannealed steel sheet having excellent formability and hole expansion properties and reasons for limitations thereof, will be described.

A high-strength galvannealed steel sheet according to aspects of the present invention can be manufactured by hot rolling steel having the above-described chemical composition, then cold rolling into a steel sheet, subsequently annealing and galvanizing the steel sheet on a continuous galvanizing line (hereinafter, referred to as CGL), and then performing alloying treatment.

Hot Rolling

Hot rolling can be performed under common conditions.

Pickling

Pickling treatment is preferably performed after hot rolling. After mill scale formed on a surface has been removed in the pickling process, cold rolling is performed. Pickling conditions are not particularly limited.

Cold Rolling

Aspects of the present invention are characterized by performing cold rolling at a cold rolling reduction ratio of 20% or more and 35% or less. Further, as necessary, when cold rolling is performed, rolling is preferably performed by using, as a roll for final stand, a roll having an arithmetic-average rolling roll surface roughness (Ra) of 3.6 μm or more. Cold rolling may be performed under common conditions except for the cold rolling reduction ratio.

Cold Rolling Reduction Ratio: 20% or More and 35% or Less

An important feature according to aspects of the present invention is to leave strain introduced by cold rolling until after annealing and galvanizing and to perform alloying treatment, thereby promoting diffusion of Mn into a coated layer during an alloying reaction and increasing the Mn concentration in the coated layer. When the cold rolling reduction ratio exceeds 35%, recrystallization occurs during CGL annealing following cold rolling, thereby decreasing the amount of strain. As a result, an effect of promoting Mn diffusion by strain cannot be obtained. Meanwhile, when the cold rolling reduction ratio is less than 20%, cold rolling efficiency is decreased. Accordingly, the cold rolling reduction ratio is set to. 20% or more and 35% or less and preferably 23% or more and preferably 33% or less.

Arithmetic-Average Rolling Roll Surface Roughness (Ra) of Final Stand: 3.6 μm or More (Preferred Condition)

In cold rolling, rolling is preferably performed by using a roll having an arithmetic-average rolling roll surface roughness (Ra) of 3.6 μm or more as a roll for final stand. In this case, the surface area on a steel sheet surface increases, thereby activating an alloying reaction. In addition, diffusion of elemental Mn into a coated layer can be promoted. To obtain such effects, the arithmetic-average rolling roll surface roughness (Ra) needs to be 3.6 μm or more. Although the upper limit is not particularly set, maintaining an arithmetic-average rolling roll surface roughness (Ra) exceed 20 μm is disadvantageous in terms of costs in some cases. Accordingly, cold rolling is preferably performed by using a final stand having an arithmetic-average rolling roll surface roughness (Ra) of 3.6 μm or more. The arithmetic-average rolling roll surface roughness (Ra) herein is an average surface roughness, which is set to be an average surface roughness in the roll surface C direction at ¼, ½, and ¾ positions in the roll width direction. The arithmetic-average rolling roll surface roughness (Ra) can be determined according to the method described in the Examples section.

Annealing Before Galvanizing Treatment

In accordance with aspects of the present invention, when annealing and galvanizing treatment are performed in continuous galvanizing equipment, a maximum steel sheet temperature to be reached in an annealing furnace is set to 600° C. or higher and 700° C. or lower. Further, as necessary, it is preferable to set a steel sheet transit time in a steel sheet temperature range of 500° C. or higher and 700° C. or lower to 30 seconds or more and 600 seconds or less; to set a hydrogen concentration in the steel sheet temperature range of 500° C. or higher and 700° C., or lower to 5 vol % or more and 50 vol % or less; and to set a dew point of an atmosphere in the steel sheet temperature range of 500° C. or higher and 700° C. or lower to −65° C. or higher and −25° C. or lower.

Maximum Steel Sheet Temperature to be Reached in Annealing Furnace: 600° C. or Higher and 700° C. or Lower When the maximum steel sheet temperature to be reached is lower than 600° C., stable operation becomes difficult due to the high strength of a steel sheet, impaired sheet traveling properties, and warping of the steel sheet. Meanwhile, when the maximum steel sheet temperature to be reached exceeds 700° C., recrystallization progresses considerably, and an effect of promoting Mn diffusion by strain cannot be obtained. Accordingly, the maximum steel sheet temperature to be reached in an annealing furnace is set to 600° C. or higher and 700° C. or lower.

Steel Sheet Transit Time in Steel Sheet Temperature Range of 500° C. or Higher and 700° C. or Lower: 30 Seconds or More and 600 Seconds or Less (Preferred Condition)

When the steel sheet transit time in a steel sheet temperature range of 500° C. or higher and 700° C. or lower is less than 30 seconds, temperature control of the steel sheet is difficult in some cases. Meanwhile, when the transit time exceeds 600 seconds, the amount of Mn oxide formed on the steel sheet surface becomes excessive due to water vapor in the furnace and Mn in steel, thereby impairing coating appearance in some cases. Accordingly, the steel sheet transit time in a steel sheet temperature range of 500° C. or higher and 700° C. or lower is preferably set to 30 seconds or more and 600 seconds or less.

Hydrogen Concentration of Atmosphere in Steel Sheet Temperature Range of 500° C. or Higher and 700° C. or Lower: 5 vol % or More and 50 vol % or Less (Preferred Condition)

As the hydrogen concentration in the furnace is increased, the above-mentioned amount of Mn oxide formed on a steel sheet surface due to water vapor in the furnace can be further suppressed. When the hydrogen concentration of an atmosphere in a steel sheet temperature range of 500° C. or higher and 700° C. or lower is less than 5 vol %, such an effect cannot be obtained in some cases. Meanwhile, when the hydrogen concentration exceeds 50 vol %, the above-mentioned effect levels off and becomes disadvantageous in terms of costs in some cases. Accordingly, the hydrogen concentration of an atmosphere in a steel sheet temperature range of 500° C. or higher and 700° C. or lower is preferably set to 5 vol % or more and 50 vol % or less. The hydrogen concentration in the furnace is determined by a feed gas ratio into the furnace. Further, the hydrogen concentration in the furnace is desired to be monitored and adjusted appropriately.

Dew Point of Atmosphere in Steel Sheet Temperature Range of 500° C. or Higher and 700° C. or Lower: −65° C. or Higher and −25° C. or Lower (Preferred Condition)

As the dew point in the furnace becomes lower, the above-mentioned amount of Mn oxide formed on a steel sheet surface due to water vapor in the furnace can be further suppressed. When the dew point of an atmosphere in a steel sheet temperature range of 500° C. or higher and 700° C. or lower exceeds −25° C., such an effect cannot be obtained in some cases. Meanwhile, when the dew point is lower than −65° C., the above-mentioned effect levels off and becomes disadvantageous in terms of costs in some cases. Accordingly, the dew point of an atmosphere in a steel sheet temperature range of 500° C. or higher and 700° C. or lower is preferably set to −65° C. or higher and −25° C. or lower.

Galvanizing Treatment After Annealing

Galvanizing treatment may be performed under common conditions.

Alloying Treatment After Galvanizing at Temperature of 450° C. or Higher and 600° C. or Lower and Fe Content in Zinc Coated Layer of 7 to 15 Mass % Range Alloying Temperature: 450° C. or Higher and 600° C. or Lower The alloying treatment after galvanizing treatment is performed by heating a steel sheet at 450° C. or higher and 600° C. or lower. To achieve Fe content of the above-mentioned range in the zinc coated layer, which is an object according to aspects of the present invention, heating at 450° C. or higher and 600° C. or lower is required. When the heating temperature is lower than 450° C., alloying is unsatisfactory. Meanwhile, the heating temperature exceeds 600° C., alloying progresses excessively. Since an optimal preferred range varies depending on alloying elements contained in a steel sheet, fine tuning is preferably performed by measuring Fe content in a coated layer on- or off-line.

A galvannealed steel sheet according to aspects of the present invention is thus-obtained. A high-strength galvannealed steel sheet according to aspects of the present invention includes a zinc coated layer with a coating weight of 20 to 120 g/m² per side on a steel sheet surface. When the coating weight is less than 20 g/m², ensuring corrosion resistance becomes difficult. Meanwhile, the coating weight exceeds 120 g/m², peeling resistance of coatings deteriorates.

EXAMPLES

Hereinafter, aspects of the present invention will be described with Examples. The present invention, however, is not limited to the following Examples.

Steel having each chemical composition shown in Table 1 with the balance being Fe and inevitable impurities was refined in a converter and formed into a slab by a continuous casting method. The obtained slab was heated at 1,100° C. in a heating furnace, subsequently hot rolled to 2.2 mm, and then coiled at 550° C. Mill scale was then removed by pickling, and cold rolling was performed to 1.6 mm in a 20 to 35% range. When cold rolling was performed, an arithmetic-average roughness (Ra) of the average roll of the final rolling stand was varied. Subsequently, heat treatment (annealing) was performed on the obtained cold rolled steel sheet under the conditions shown in Table 2 by using continuous galvanizing equipment having RTF (heating zone)-cooling zone. The atmosphere in the annealing furnace was composed of $N_2$—$H_2$—$H_2O$ with the balance being inevitable impurities, and the hydrogen concentration was adjusted by a $H_2$—$N_2$ ratio of a feed gas. The dew point was adjusted by moistening a feed gas. A gas in the furnace was introduced to a hydrogen meter and a dew point meter, and confirmed whether predetermined hydrogen concentration and dew point were achieved. The steel sheet after annealing was then cooled to 460° C. and subjected to galvanizing treatment. A plating bath was adjusted to a bath temperature of 460° C. and the bath composition containing 0.1 mass % of Al with the balance being Zn and inevitable impurities. After immersion, a coating weight was adjusted to 50 g/m² per side by gas wiping. After the wiping treatment, the steel sheet was heated to 480° C. to 540° C. by using an IH heater and subjected to alloying treatment to yield a galvannealed steel sheet.

The thus-obtained galvannealed steel sheets (GA) were evaluated for the Fe concentration in a coated layer, the concentration of Mn in the non-oxide, non-carbide, non-sulfide form in the coated layer, coating surface appearance, mechanical characteristics, and hole expansion properties according to the following measurement methods and evaluation criteria. The results are shown in Table 2.

(1) Fe Concentration in Coated Layer

The coated layer, as well as an oxide, a carbide, and a sulfide in the coated layer, is dissolved by using hydrochloric acid added with a corrosion inhibitor for iron, and mass % of Fe in hydrochloric acid is determined by ICP atomic emission spectroscopy.

(2) Concentration of Mn in Non-Oxide, Non-Carbide, Non-Sulfide Form in Coated Layer The coated layer, as well as an oxide, a carbide, and a sulfide in the coated layer, is dissolved by using hydrochloric acid added with a corrosion inhibitor for iron, and mass % of Mn in hydrochloric acid is determined by ICP atomic emission spectroscopy and the total Mn concentration in the coated layer (A) is determined. Meanwhile, the coating alone is subjected to anodic dissolution, the remaining oxide, carbide, and sulfide as residue are extracted, then dissolved with hydrochloric acid, mass % of Mn in hydrochloric acid is determined by ICP atomic emission spectroscopy, and the concentration of Mn in the oxide, carbide, and sulfide form in the coated layer (B) is determined. The concentration of Mn in the non-oxide, non-carbide, non-sulfide form in the coated layer is calculated from their difference (A−B).

(3) Arithmetic-Average Rolling Roll Surface Roughness (Ra)

The arithmetic-average rolling roll surface roughness (Ra) is measured in a contact type. Surface roughness in the roll surface C direction at ¼, ½, and ¾ positions in the roll width direction is each measured at n=3, and an average value of the total nine measurements is set as the arithmetic-average rolling roll surface roughness. The measurement length is set as an average value. The measurement length is set to 2.5 mm and the cut-off is set to 0.8 mm.

(4) Coating Appearance

The coating appearance is visually evaluated for a randomly selected 5 m² region. In accordance with aspects of the present invention, coating appearance was evaluated according to the criteria described below in view of expected uses as automotive inner panels. A, B, and C are evaluated as satisfactory.

D: defective appearance in which bare spots are present or surface defects that emerge as a surface pattern, such as alloying unevenness, are present at 100/m² or more C: excellent appearance in which surface defects are present at 30/m² or more and less than 100/m²

B: further excellent appearance in which surface defects are present at 1/m² or more and less than 30/m²

A: still further excellent appearance without surface defects (5) Mechanical Characteristics Mechanical characteristics (tensile strength TS, elongation El) are evaluated by a tensile test. The tensile test was performed according to JIS Z 2241 (2011) by using JIS No. 5 test piece, which was a sample taken so that the tensile direction became a perpendicular direction to the rolling direction of a steel sheet, and TS (MPa) and El (%) were determined. In accordance with aspects of the present invention, the case of TS≥980 MPa was evaluated as excellent. A steel sheet with TS of 980 MPa or higher and lower than 1,180 MPa was evaluated as excellent when it satisfies El≥24%, and a steel sheet with TS of 1,180 MPa or higher was evaluated as excellent when it satisfies El≥18%.

(6) Hole Expansion Properties

Hole expansion properties were evaluated according to JIS Z 2256 (2010). Each of the obtained steel sheets was cut into 100 mm×100 mm, and then punched at clearance 12%±1% to form a 10 mm-diameter hole. A hole diameter at the crack initiation limit was measured by pressing a 60° cone punch into the hole while holding with blank holder force of 9 tons (88.26 kN) by using a die having an inner diameter of 75 mm. Further, a limiting hole expansion ratio λ (%) was calculated according to the equation below, and hole expansion properties were evaluated from the calculated limiting hole expansion ratio.

$$\text{Limiting hole expansion ratio } \lambda\ (\%) = [(D_f - D_0)/D_0] \times 100$$

where $D_f$ is a hole diameter in crack initiation (mm), and $D_0$ is an initial hole diameter (mm). In accordance with aspects of the present invention, the case satisfying λ≥20% was evaluated as excellent.

The results obtained as described above are shown in Table 2.

TABLE 1

| | Chemical composition of steel (mass %, balance being Fe and inevitable impurities) | | | | | | | | | | | | | | | | |
|---|---|---|---|---|---|---|---|---|---|---|---|---|---|---|---|---|---|
| Symbol | C | Si | Mn | Al | P | S | B | Nb | Ti | Cr | Mo | Cu | Ni | Sn | Sb | Ta | W | V |
| A | 0.26 | 0.30 | 4.2 | 0.38 | 0.073 | 0.009 | — | — | — | — | — | — | — | — | — | — | — | — |
| B | 0.20 | 0.28 | 5.8 | 0.84 | 0.083 | 0.003 | — | — | — | — | — | — | — | — | — | — | — | — |
| C | 0.03 | 0.73 | 7.0 | 0.51 | 0.051 | 0.001 | — | — | — | — | — | — | — | — | — | — | — | — |
| D | 0.33 | 0.64 | 4.6 | 0.35 | 0.045 | 0.006 | — | — | — | — | — | — | — | — | — | — | — | — |
| E | 0.21 | 0.23 | 7.5 | 0.44 | 0.025 | 0.004 | — | — | — | — | — | — | — | — | — | — | — | — |

TABLE 1-continued

Chemical composition of steel (mass %, balance being Fe and inevitable impurities)

| Symbol | C | Si | Mn | Al | P | S | B | Nb | Ti | Cr | Mo | Cu | Ni | Sn | Sb | Ta | W | V |
|---|---|---|---|---|---|---|---|---|---|---|---|---|---|---|---|---|---|---|
| F | 0.32 | 0.17 | 3.9 | 0.85 | 0.096 | 0.005 | 0.003 | — | — | — | — | — | — | — | — | — | — | — |
| G | 0.25 | 0.19 | 5.5 | 0.72 | 0.055 | 0.009 | — | 0.020 | — | — | — | — | — | — | — | — | — | — |
| H | 0.15 | 0.86 | 3.7 | 0.10 | 0.076 | 0.006 | — | — | 0.030 | — | — | — | — | — | — | — | — | — |
| I | 0.14 | 0.82 | 6.7 | 0.56 | 0.097 | 0.008 | — | — | — | 0.600 | — | — | — | — | — | — | — | — |
| J | 0.26 | 0.14 | 4.7 | 0.04 | 0.004 | 0.006 | — | — | — | — | 0.20 | — | — | — | — | — | — | — |
| K | 0.08 | 0.20 | 4.9 | 0.56 | 0.009 | 0.001 | — | — | — | — | — | 0.60 | — | — | — | — | — | — |
| L | 0.15 | 0.39 | 6.4 | 0.69 | 0.045 | 0.001 | — | — | — | — | — | — | 0.20 | — | — | — | — | — |
| M | 0.03 | 0.12 | 7.8 | 0.53 | 0.006 | 0.004 | — | — | — | — | — | — | — | 0.200 | — | — | — | — |
| N | 0.12 | 0.58 | 5.6 | 0.70 | 0.051 | 0.002 | — | — | — | — | — | — | — | — | 0.100 | — | — | — |
| O | 0.08 | 0.90 | 7.3 | 0.63 | 0.082 | 0.007 | — | — | — | — | — | — | — | — | — | 0.050 | — | — |
| P | 0.09 | 0.52 | 6.9 | 0.70 | 0.042 | 0.007 | — | — | — | — | — | — | — | — | — | — | 0.050 | — |
| Q | 0.05 | 0.42 | 4.8 | 0.14 | 0.033 | 0.009 | — | — | — | — | — | — | — | — | — | — | — | 0.050 |
| XA | <u>0.02</u> | 0.64 | 4.4 | 0.23 | 0.039 | 0.004 | — | — | — | — | — | — | — | — | — | — | — | — |
| XB | 0.10 | <u>1.30</u> | 7.3 | 0.75 | 0.045 | 0.002 | — | — | — | — | — | — | — | — | — | — | — | — |
| XC | 0.12 | 0.12 | <u>3.3</u> | 0.50 | 0.060 | 0.005 | — | — | — | — | — | — | — | — | — | — | — | — |
| XD | 0.28 | 0.16 | <u>8.3</u> | 0.65 | 0.044 | 0.005 | — | — | — | — | — | — | — | — | — | — | — | — |
| XE | 0.08 | 0.79 | 4.4 | <u>1.20</u> | 0.016 | 0.003 | — | — | — | — | — | — | — | — | — | — | — | — |

*Underlines represent being outside the scope of the present invention.

TABLE 2

| | | | Manufacturing conditions | | | | |
|---|---|---|---|---|---|---|---|
| No. | Steel type | Cold reduction ratio (%) | Maximum steel sheet temperature reached in annealing furnace (° C.) | Arithmetic-average rolling roll surface roughness (Ra) of cold rolling final stand (μm) | Steel sheet transit time in steel sheet temperature range of 500° C. to 700° C. (s) | In-furnace H$_2$ concentration in steel sheet temperature range of 500° C. to 700° C. (vol %) | In-furnace dew point in steel sheet temperature range of 500° C. to 700° C. (° C.) |
| 1 | A | 22 | 690 | 3.6 | 170 | 22 | −63 |
| 2 | A | 27 | 650 | <u>2.1</u> | 360 | 45 | −44 |
| 3 | A | <u>18</u> | 670 | 6.3 | 260 | 48 | −63 |
| 4 | B | 33 | 680 | <u>2.1</u> | 570 | 26 | −49 |
| 5 | B | 34 | <u>720</u> | <u>2.7</u> | 500 | 20 | −42 |
| 6 | B | 25 | 640 | 9.8 | 160 | 46 | −39 |
| 7 | C | 31 | 680 | <u>2.1</u> | 450 | 22 | −55 |
| 8 | C | 35 | 620 | 5.4 | 290 | <u>4</u> | −42 |
| 9 | C | <u>37</u> | 610 | 5 | 260 | 48 | −53 |
| 10 | D | 23 | <u>580</u> | 8 | 250 | 41 | −49 |
| 11 | D | 34 | 690 | 7 | 70 | 18 | <u>−22</u> |
| 12 | D | 32 | 700 | 6.6 | <u>620</u> | 29 | −35 |
| 13 | E | 32 | 680 | <u>3.4</u> | 420 | 48 | −56 |
| 14 | E | 23 | 610 | 5.6 | 370 | 7 | −60 |
| 15 | E | <u>48</u> | 630 | 8.4 | 50 | 19 | −27 |
| 16 | F | 27 | 610 | 7.9 | 430 | 31 | −48 |
| 17 | G | 20 | 690 | 9.1 | 450 | 27 | −30 |
| 18 | H | 31 | 600 | 4.7 | 570 | 33 | −41 |
| 19 | I | 26 | 620 | 9 | 130 | 6 | −55 |
| 20 | J | 26 | 630 | 6.3 | 350 | 30 | −56 |
| 21 | K | 21 | 630 | 6.7 | 460 | 8 | −48 |
| 22 | L | 25 | 680 | 8.9 | 570 | 12 | −63 |
| 23 | M | 27 | 690 | 4.6 | 90 | 49 | −65 |
| 24 | N | 25 | 620 | 6.6 | 500 | 47 | −49 |
| 25 | O | 29 | 640 | 6 | 90 | 18 | −55 |
| 26 | P | 29 | 640 | 8 | 340 | 8 | −44 |
| 27 | Q | 28 | 640 | 5.6 | 130 | 22 | −44 |
| 28 | <u>XA</u> | 31 | 690 | 8.6 | 470 | 43 | −56 |
| 29 | <u>XB</u> | 31 | 680 | 8.3 | 250 | 11 | −37 |
| 30 | <u>XC</u> | 26 | 630 | 7.4 | 120 | 16 | −48 |
| 31 | <u>XD</u> | 32 | 640 | 8.4 | 250 | 16 | −32 |
| 32 | <u>XE</u> | 20 | 660 | 7.1 | 560 | 40 | −42 |

| No. | Coating weight per side (g/m$^2$) | Fe concentration in coating (mass %) | Non-oxide, non-carbide, non-sulfide Mn concentration in coating (mass %) | Coating appearance (*1) | TS (MPa) | EL (%) | λ (%) | Example or Comparative Example |
|---|---|---|---|---|---|---|---|---|
| 1 | 50 | 11 | 0.49 | A | 1036 | 28 | 35 | Example |
| 2 | 50 | 10 | 0.34 | B | 1174 | 25 | 28 | Example |

TABLE 2-continued

| | | | | | | | | |
|---|---|---|---|---|---|---|---|---|
| 3 | 50 | 11 | <u>0.14</u> | A | 1259 | 23 | <u>19</u> | Comparative Example |
| 4 | 50 | 10 | 0.32 | B | 1161 | 29 | 29 | Example |
| 5 | 50 | 8 | <u>0.18</u> | B | 1338 | 25 | <u>15</u> | Comparative Example |
| 6 | 50 | 12 | 0.74 | A | 1038 | 32 | 34 | Example |
| 7 | 50 | 9 | 0.30 | B | 1166 | 31 | 32 | Example |
| 8 | 50 | 14 | 0.44 | C | 1248 | 29 | 25 | Example |
| 9 | 50 | 11 | <u>0.08</u> | A | 1149 | 32 | <u>18</u> | Comparative Example |
| 10 | 50 | 9 | <u>0.23</u> | A | 1340 | 23 | <u>16</u> | Comparative Example |
| 11 | 50 | 11 | 0.74 | C | 1039 | 29 | 34 | Example |
| 12 | 50 | 10 | 0.75 | C | 1179 | 26 | 29 | Example |
| 13 | 50 | 11 | 0.30 | C | 1242 | 30 | 26 | Example |
| 14 | 50 | 14 | 0.74 | A | 1156 | 32 | 29 | Example |
| 15 | 50 | 12 | <u>0.12</u> | A | 1345 | 28 | <u>12</u> | Comparative Example |
| 16 | 50 | 9 | 0.49 | A | 1030 | 28 | 36 | Example |
| 17 | 50 | 8 | 0.63 | A | 1157 | 28 | 31 | Example |
| 18 | 50 | 8 | 0.56 | A | 994 | 28 | 37 | Example |
| 19 | 50 | 11 | 0.74 | A | 1285 | 28 | 25 | Example |
| 20 | 50 | 12 | 0.64 | A | 1077 | 28 | 30 | Example |
| 21 | 50 | 9 | 0.50 | A | 1013 | 31 | 34 | Example |
| 22 | 50 | 13 | 0.50 | A | 1217 | 29 | 28 | Example |
| 23 | 50 | 11 | 0.44 | A | 1270 | 30 | 24 | Example |
| 24 | 50 | 13 | 0.72 | A | 1141 | 29 | 29 | Example |
| 25 | 50 | 14 | 0.50 | A | 1323 | 28 | 22 | Example |
| 26 | 50 | 10 | 0.59 | A | 1250 | 29 | 25 | Example |
| 27 | 50 | 9 | 0.61 | A | 1010 | 31 | 33 | Example |
| 28 | 50 | 12 | 0.74 | A | <u>977</u> | 31 | 25 | Comparative Example |
| 29 | 50 | 13 | <u>0.17</u> | D | 1373 | 27 | 22 | Comparative Example |
| 30 | 50 | 8 | <u>0.22</u> | A | <u>865</u> | 31 | <u>16</u> | Comparative Example |
| 31 | 50 | 12 | <u>0.23</u> | D | 1449 | 27 | 21 | Comparative Example |
| 32 | 50 | 13 | 0.40 | D | 1022 | 29 | 28 | Comparative Example |

*Underlines represent being outside the scope of the present invention.

(*1) A: defect-free surface B: surface defects present at 1/m² or more and less than 30/m² C: surface defects present at 30/m² or more and less than 100/m² D: bare spots present or surface defects present at 100/m² or more According to Table 2, high-strength galvannealed steel sheets of the present Examples have excellent coating appearance, mechanical characteristics, and hole expansion properties. Meanwhile, Comparative Examples have at least either impaired coating appearance, mechanical characteristics, or hole expansion properties.

INDUSTRIAL APPLICABILITY

A high-strength galvannealed steel sheet according to aspects of the present invention having excellent formability and hole expansion properties can be formed into parts having, in particular, complex shapes, and thus is applicable as a surface-treated steel sheet for reducing weight and increasing strength of automotive bodies. Moreover, in addition to automobiles, a high-strength galvannealed steel sheet according to aspects of the present invention is applicable, as a surface-treated steel sheet in which rust resistance is imparted to a raw material steel sheet, to a wide range of fields, such as home appliances and construction materials.

The invention claimed is:

1. A high-strength galvannealed steel sheet having a chemical composition comprising, in mass %,
C: 0.03 to 0.35%,
Si: 0.01 to 1.00%,
Mn: 3.6 to 8.0%,
Al: 0.001 to 1.00%,
P: 0.100% or less, and
S: 0.010% or less,
with the balance being Fe and inevitable impurities, and including
a zinc coated layer with a coating weight of 20 to 120 g/m² per side on a surface of a steel sheet, wherein:
Fe content of the zinc coated layer is set to a 7 to 15 mass % range; and
the zinc coated layer contains 0.25 mass % or more of Mn in a form not corresponding to any of an oxide, a carbide, or a sulfide.

2. The high-strength galvannealed steel sheet according to claim 1, further comprising, in mass %, in addition to the chemical composition, one or more selected from
B: 0.001 to 0.005%,
Nb: 0.005 to 0.050%,
Ti: 0.005 to 0.100%,
Cr: 0.001 to 1.000%,
Mo: 0.05 to 1.00%,
Cu: 0.05 to 1.00%,
Ni: 0.05 to 1.00%,
Sn: 0.001 to 0.200%,
Sb: 0.001 to 0.200%,
Ta: 0.001 to 0.100%,
W: 0.001 to 0.100%, and
V: 0.001 to 0.100%.

3. The high-strength galvannealed steel sheet according to claim 1, wherein the high-strength galvannealed steel sheet has a tensile strength TS of 980 MPa or more, determined according to JIS Z2241 (2011) by using JIS No. 5 test piece, which was a sample taken so that the tensile direction became a perpendicular direction to the rolling direction of the steel sheet.

4. The high-strength galvannealed steel sheet according to claim 1, wherein the high-strength galvannealed steel sheet has an elongation El of:
   (i) 24% or more for the steel sheet having TS of 980 MPa or higher and lower than 1,180 MPa, or
   (ii) 18% or more for the steel sheet having TS of 1,180 MPa or higher.

5. The high-strength galvannealed steel sheet according to claim 1, wherein the high-strength galvannealed steel sheet has a hole expansion ratio $\lambda$ of 20% or higher.

* * * * *